(12) United States Patent
Sugimura

(10) Patent No.: US 7,753,631 B2
(45) Date of Patent: Jul. 13, 2010

(54) PITCH DIAMETER DISPLACED SCREW

(76) Inventor: Nobuyuki Sugimura, 3-27, Shimizu Mabase-kita, Shizuoka-shi, Shizuoka-ken (JP)

( * ) Notice: Subject to any disclaimer, the term of this patent is extended or adjusted under 35 U.S.C. 154(b) by 932 days.

(21) Appl. No.: 10/833,360

(22) Filed: Apr. 28, 2004

(65) Prior Publication Data

US 2004/0218991 A1   Nov. 4, 2004

(30) Foreign Application Priority Data

Apr. 30, 2003  (JP)  ............................. 2003-124899

(51) Int. Cl.
  *F16B 33/00*  (2006.01)
  *F16B 39/30*  (2006.01)
(52) U.S. Cl. .................... 411/366.1; 411/308; 411/310
(58) Field of Classification Search ......... 411/308–310, 411/366.1
See application file for complete search history.

(56) References Cited

U.S. PATENT DOCUMENTS

| | | | | |
|---|---|---|---|---|
| 2,842,180 A | * | 7/1958 | Brown et al. ................. | 411/285 |
| 2,870,668 A | * | 1/1959 | Flahaut ....................... | 411/436 |
| 3,266,363 A | * | 8/1966 | Bronson et al. ............. | 411/436 |
| 3,454,070 A | * | 7/1969 | Phipard, Jr. ................. | 411/168 |
| 3,487,442 A | * | 12/1969 | Rossmann ................... | 220/288 |
| 3,664,540 A | * | 5/1972 | Witkin ........................ | 220/288 |
| 3,701,372 A | * | 10/1972 | Breed .......................... | 411/309 |
| 3,794,092 A | * | 2/1974 | Carlson et al. .............. | 411/310 |
| 3,927,503 A | * | 12/1975 | Wilson ........................ | 411/311 |
| 4,071,067 A | * | 1/1978 | Goldby ....................... | 411/307 |
| 4,090,544 A | * | 5/1978 | Bagheri et al. .............. | 411/259 |
| 4,258,607 A | * | 3/1981 | McKewan ................... | 411/417 |
| 4,540,321 A | * | 9/1985 | Berecz ........................ | 411/310 |
| 4,786,226 A | * | 11/1988 | Jende .......................... | 411/392 |
| 4,943,095 A | * | 7/1990 | Sugimura .................... | 285/334 |
| 4,958,973 A | * | 9/1990 | Sugimura .................... | 411/423 |

(Continued)

FOREIGN PATENT DOCUMENTS

JP    01224510 A  *  9/1989

(Continued)

OTHER PUBLICATIONS

ASME, #234 The United States Standard Screw Threads (1864), 1 page, downloaded from http://www.asme.org/Communities/History/Landmarks/234_United_States_Standard.cfm.*

(Continued)

*Primary Examiner*—Victor Batson
*Assistant Examiner*—David C Reese
(74) *Attorney, Agent, or Firm*—Price, Heneveld, Cooper, DeWitt & Litton, LLP

(57) ABSTRACT

A screw comprising a first member having a plurality of alternating first thread ridges and first thread grooves, a ridge width of the first thread ridges being larger than a groove width of the first thread grooves at a measurement diameter of the first member. The measurement diameter is determined by calculating a pitch diameter of a hypothetical member having a plurality of hypothetical thread grooves and hypothetical thread ridges, with the hypothetical thread grooves being identical to the first thread grooves, and with the hypothetical thread ridges and the hypothetical thread grooves having identical, but opposite, profiles, and with the measurement diameter being identical to the pitch diameter of the hypothetical member.

13 Claims, 4 Drawing Sheets

U.S. PATENT DOCUMENTS

| | | | | |
|---|---|---|---|---|
| 5,242,252 | A | * | 9/1993 | Harle .......................... 411/311 |
| 5,395,195 | A | * | 3/1995 | Fulmer ....................... 411/386 |
| 5,713,686 | A | * | 2/1998 | Maughan ..................... 403/46 |
| 5,738,472 | A | * | 4/1998 | Roopnarine et al. ......... 411/309 |
| 5,876,168 | A | * | 3/1999 | Iwata .......................... 411/308 |
| 5,964,768 | A | * | 10/1999 | Huebner ...................... 606/73 |
| 2004/0218991 | A1 | * | 11/2004 | Sugimura ................... 411/308 |
| 2005/0207868 | A1 | * | 9/2005 | Uno et al. ................... 411/386 |

FOREIGN PATENT DOCUMENTS

| | | | | |
|---|---|---|---|---|
| JP | 01242808 | A | * | 9/1989 |
| JP | 02021012 | A | * | 1/1990 |
| JP | 02163506 | A | * | 6/1990 |
| JP | 408177831 | | * | 7/1996 |
| JP | 4-77017 | | | 4/2003 |
| JP | 477017 | | | 4/2003 |

OTHER PUBLICATIONS

ASME, search results for term "screw standard", 1 page only provided referencing first 9 of 260 results, downloaded from http://search.asme.org/vivisimo/cgi-bin/query-meta?input-form=simple&v%3Asources=asme-test-vivisimo&v%3Aproject=asme-search&query=screw+standard. Oct. 10, 2007.*

* cited by examiner

PITCH DIAMETER DISPLACED SCREW

BACKGROUND OF THE INVENTION

The present invention relates to a screw used in an accumulator and the like. In particular, it relates to a pitch diameter displaced screw in which, between an external screw and an internal screw that engage with each other, the strength of a weaker screw is improved.

Conventionally, for the accumulator and the like, there is used a triangular screw, for example, a metric screw and an inverse buttress screw. As shown in FIG. 4, in a standard triangular screw, a sectional shape of a thread ridge is formed in an approximately regular triangle. Further, as shown in FIG. 5, in a standard inverse buttress screw, flank inclination angles of its thread ridge are formed in an inverse manner to that of a thread ridge of a buttress screw, i.e., an inclination angle of a pressure flank is formed greater than that of a clearance flank, as described in Japanese unexamined utility model publication No. Hei 4-77017 (1992-77017).)

In FIGS. 4 and 5, numeral 1 denotes an internal screw meshing with an external screw 2, and 4 denotes a thread ridge of the internal screw 1 having a pressure flank and a clearance flank. Numeral 6 denotes a pitch diameter of the internal screw 1, i.e., a diameter of such an imaginary cylinder that a width P1 of the thread ridge 4 becomes equal to a width P2 of a thread groove 8. Numeral 9 denotes an inner diameter of the internal screw 1, and numeral 11 denotes a thread groove of the external screw 2, meshing with the thread ridge 4 of the internal thread. Numeral 13 denotes an outer diameter of a thread ridge 14 of the external screw 2, numeral 16 denotes a pitch diameter of the external screw 2, and A2 denotes a load applying direction.

Incidentally, a pitch P is equal to a total of the width P1 of the thread ridge 4 and the width P2 of the thread groove 8. Further, each of the widths P1, P2 is a half of the pitch P, i.e., P/2.

In the conventional screw, as to the mutually meshing external screw 2 and internal screw 1, since the pitch diameters 6, 16 are located in the center of meshing heights of the thread ridges 4, 14, the width P1 of the thread ridge 4 of the internal screw 1 becomes equal to the width P2 of the thread ridge 14 of the external screw 2, meshing with the thread groove 8 of the internal screw. When a load in the arrow A2 direction is exerted on the external screw 2 in this state, a compressive force is applied to the external screw 2 while a tensile force is applied to the internal screw 1, and both forces are equal. Incidentally, at this time, a compressive stress concentrates on thread bottom 10 of the external screw 2, and a tensile stress concentrates on thread bottom 5 of the internal screw 1.

However, since a screw has a property that it is resistant to the compressive force but weak at the tensile force, in a case where the force of the same magnitude is applied to both thread ridges 4, 14, a screw to which the tensile force is applied, i.e., the internal screw 1, is the first to suffer a breakage from the thread bottom 5. Namely, the internal screw 1 is smaller in its fracture strength than the external screw 2, and weaker.

SUMMARY OF THE INVENTION

In view of the above circumstances, an object of the present invention is to improve the fracture strength of the weaker screw. According to the present invention, a width of a thread ridge in a position of a standard pitch diameter is formed greater than a width of a thread groove, thereby displacing a pitch diameter. Further, according to the present invention, with respect to a weaker screw between an internal screw and an external screw which mesh with each other, a width of a thread ridge in a position of its standard pitch diameter is formed greater than a width of a thread groove, thereby displacing a pitch diameter.

DETAILED DESCRIPTION OF THE PREFERRED EMBODIMENTS

Figure 1:
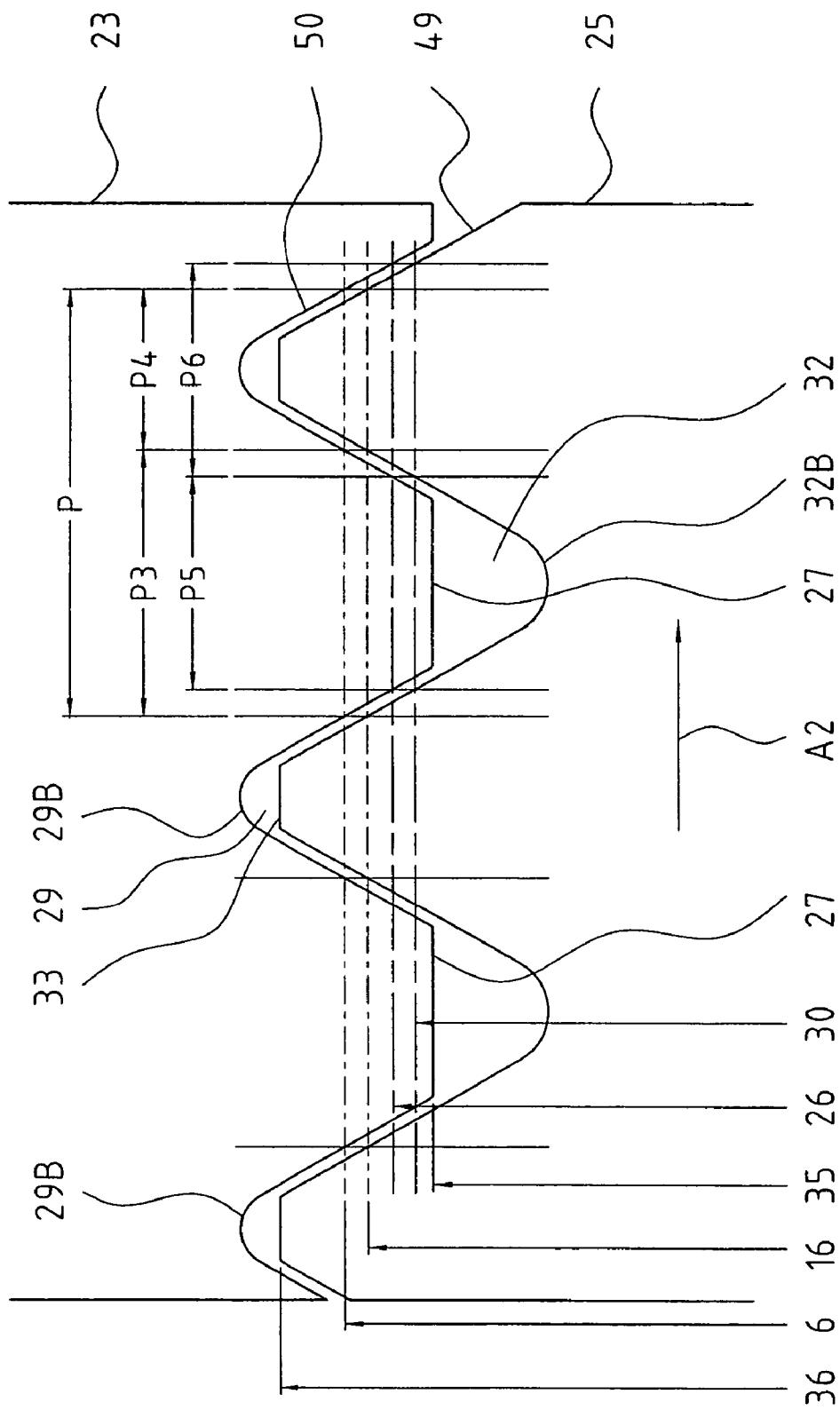
FIG. 1 is a main part enlarged longitudinal sectional view showing a first embodiment of the present invention.

The first embodiment of the present invention will be explained with FIGS. 1 and 2. An accumulator ACC has a bladder 19 inside a container main body 18. The bladder 19 is a pleated bladder and provided with creases so as to be folded in a predetermined shape.

A flange part 20 of the bladder 19 is fixed by a lid 21 in an upper part 18a of the container main body 18. The lid 21 is provided with an intake and exhaust cylinder 22 communicating with an inside of the bladder 19, and an external screw 25 meshing with an internal screw 23 of the container main body 18. Both of the screws 23, 25 are typically formed from the same material, but can be formed from different materials.

Figure 4:
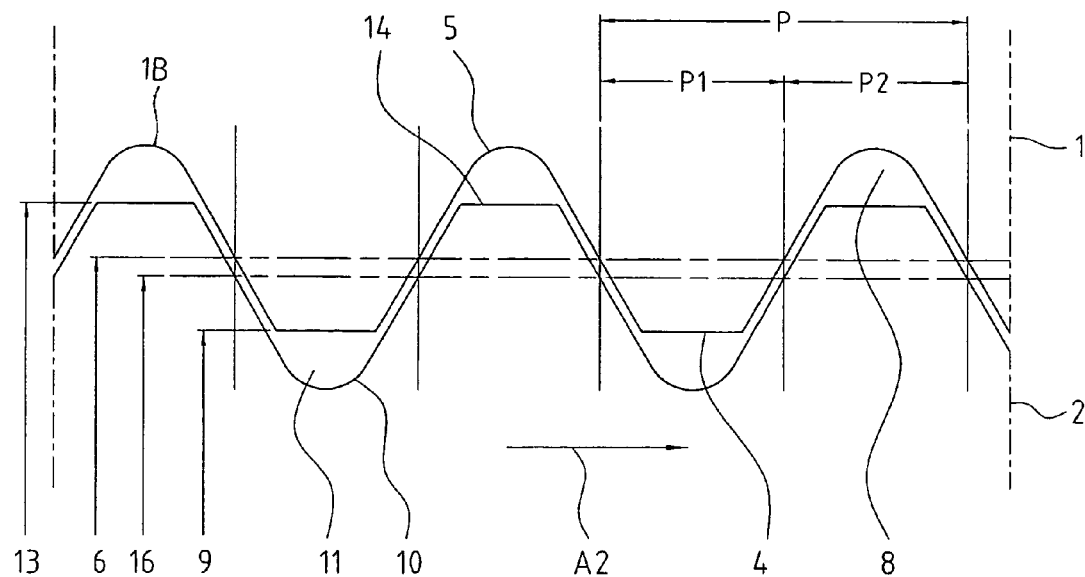
FIG. 4 is a longitudinal sectional view showing a prior art example (standard metric screw)

Each of the screws 23, 25 correspond to a triangular screw in a state that the position of a pitch diameter (hereinafter referred to as the standard pitch diameter) of the standard triangular thread (metric screw) shown in FIG. 4 is shifted. Namely, a position of a pitch diameter 26 of the internal screw 23 is such a position that a width P3 (FIG. 1) of a thread ridge 27 in a position of the standard pitch diameter 6 is made greater at a predetermined ratio than a width P4 of a thread groove 29. Further, a position of a pitch diameter 30 of the external screw 25 is such a position that the width P3 of a thread groove 32 in a position of the standard pitch diameter 16 is made greater at the above predetermined ratio than the width P4 of a thread ridge 33.

As this predetermined ratio P3:P4, there is adopted 1.25:0.75. However, this ratio is suitably selected as occasion demands within a range of P3>P4, and it is possible to adopt, for example, from about 1.2:0.8 to about 1.5:0.5.

Incidentally, numeral 35 (FIG. 1) denotes an inner diameter of the internal screw, numeral 36 denotes an outer diameter of the external screw, P denotes a pitch, P5 denotes a width of the thread ridge of the internal screw in a position of the displaced pitch diameter, P6 (FIG. 1) denotes a width of the thread groove of the internal screw in the position of the displaced pitch diameter, and 18c (FIG. 2) denotes an axis of the accumulator ACC.

A bottom part 18b of the container main body 18 is provided with a through-hole 38, and an intake and exhaust cylinder 39 is attached to the through-hole 38 through an O-ring. A flange part 40 of the intake and exhaust cylinder 39 is pressure-contacted to a receiving part 42 of the through-hole 38.

The intake and exhaust cylinder 39 includes a poppet valve 45 with a cushion cup 43 is supported so as to be capable of sliding. The intake and exhaust cylinder 39 is fixed to the container main body 18 by a threaded nut 46.

Next, an operation of this embodiment will be explained.

The accumulator ACC is connected to a hydraulic circuit (not shown in the drawing) through the intake and exhaust cylinder 39. If a hydraulic pressure of the hydraulic circuit changes and a pressure in the container main body 18 (FIG. 2) is increased, the lid 21 is pressed in the arrow A2 direction, and a pressure flank 49 (FIG. 1) of the thread ridge 33 presses a pressure flank 50 of the thread ridge 27. For this reason, a tensile load concentrates on a thread bottom 29B of the internal screw, and the compressive stress is generated in a thread bottom 32B of the external screw. However, since the thickness of the thread ridge 27 of the internal screw is greater than that of the thread ridge 33 of the external thread, i.e., since the internal screw 23 is stronger in its fracture strength than the external screw 25, the tensile stress generated in the thread bottom 29B of the internal screw 23 becomes extremely smaller than the prior art. Accordingly, it is possible to prevent the internal screw 23, having a property of weakness against the tensile force, from being fractured.

Figure 2:
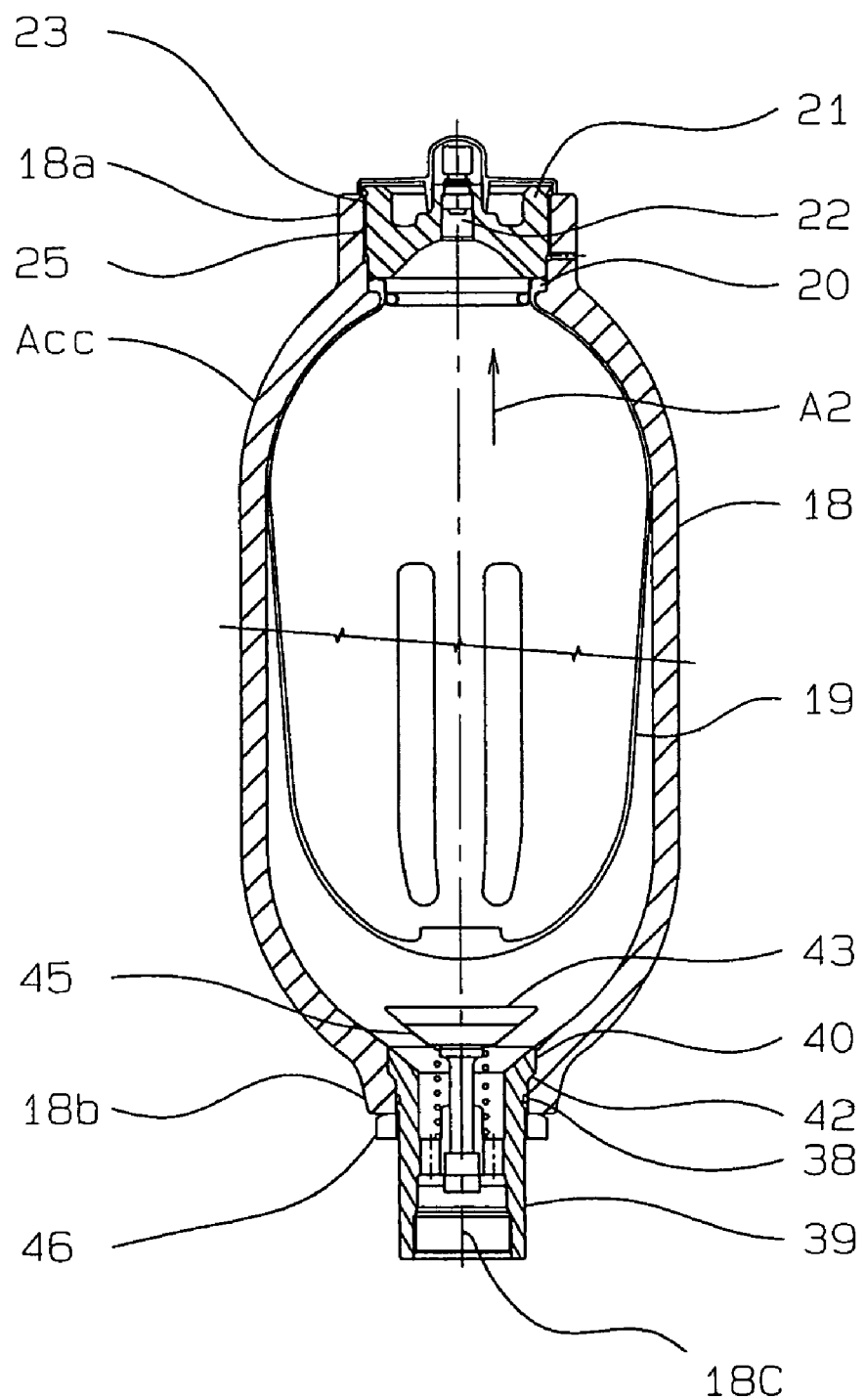
FIG. 2 is a longitudinal sectional view showing the first embodiment of the present invention.
Figure 3:
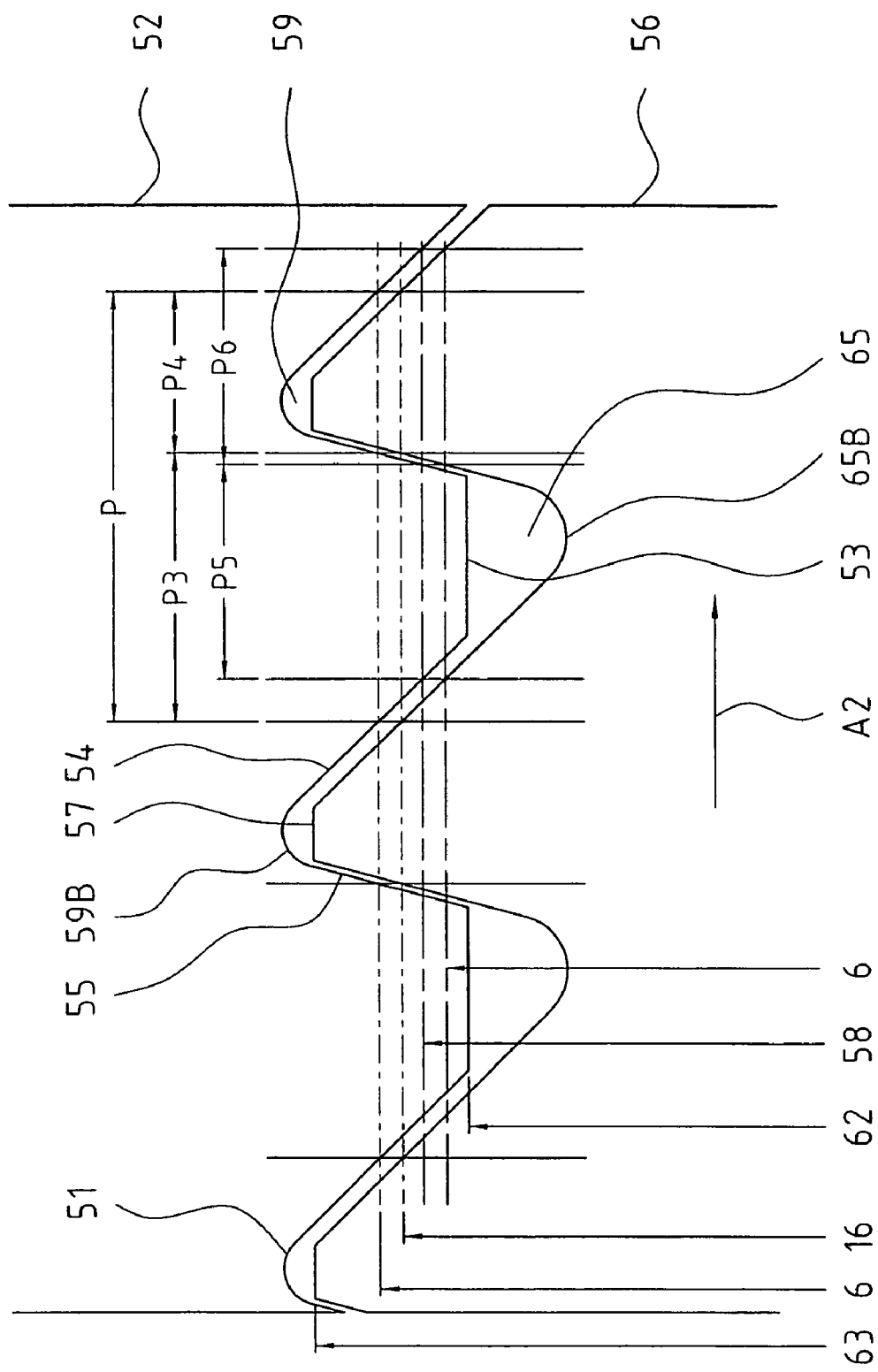
FIG. 3 is a main part enlarged longitudinal sectional view showing a second embodiment of the present invention.

The second embodiment of the present invention will be explained with FIG. 3, and the same reference numerals as that shown in FIGS. 1 and 2 are the same in their names and functions. In FIG. 3, 59B denotes a thread bottom of the internal screw, numeral 62 denotes an inner diameter of the internal screw, numeral 63 denotes an outer diameter of the external screw, numeral 65 denotes a thread groove of the external screw, and 65B denotes a thread bottom of the external screw.

A difference between this embodiment and the first embodiment is a point that, as the screw, an inverse buttress screw is used in place of the triangular screw.

As to a thread ridge 53 of an internal screw 52 of this inverse buttress screw 51, the inclination angle of the pressure flank and that of the clearance flank of a normal buttress internal screw are made inverse, i.e., the inclination angle of a pressure flank 54 is made greater than that of a clearance flank 55. For example, the inclination angle of the pressure flank 54 is formed at 45 degrees, and that of the clearance flank 55 at 15 degrees.

Also, as to a thread ridge 57 of an external screw 56 of the above screw 51, similarly to the above internal screw ridge 53, sizes of the inclination angles of its flanks are made inverse to those of the inclination angles of the flanks of a standard inverse buttress external screw.

Figure 5:
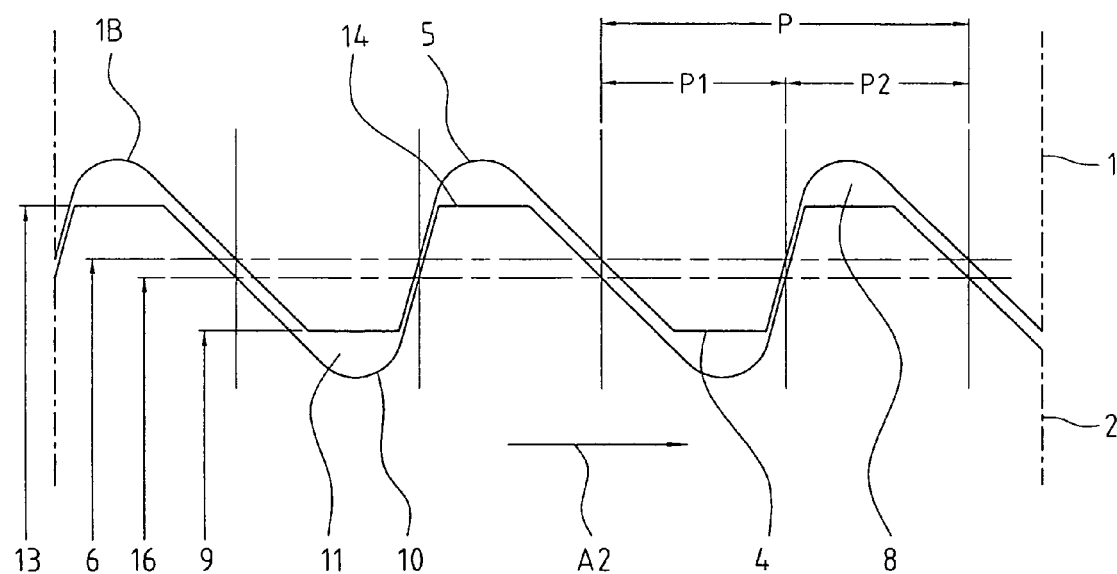
FIG. 5 is a longitudinal sectional view showing a prior art example (standard inverse buttress screw).

This screw 51 corresponds to an inverse buttress screw in a state that the position of a pitch diameter (hereinafter referred to as the standard pitch diameter) 6 of such a standard inverse buttress screw as shown in FIG. 5 is shifted to a predetermined position. Namely, a position of a pitch diameter 58 of the internal screw 52 of the inverse buttress screw 51 is such a position that the width P3 of the internal thread ridge 53 in the position of the standard pitch diameter 6 is made greater at a predetermined ratio than the width P4 of a thread groove 59.

This predetermined ratio P5:P6 is similar to the predetermined rate P3:P4 of the first embodiment.

The present invention is not limited to the above embodiments. For example, the present invention can be applied to a screw other than the triangular screw and the inverse buttress screw, and also it can be applied not only to the internal screw but also to the external screw.

EXPERIMENTAL EXAMPLES

By using the above first and second embodiments and an accumulator (made by Nippon Accumulator Co., Ltd., Type N 210-1D) of a prior art example, the inventor analyzed a tensile stress value in a first thread valley bottom of the internal screw by a finite-element method. The following results were obtained. Incidentally, the "first thread valley bottom" means a first thread valley bottom of a base portion of the internal screw, which initially undergoes a load of the external screw.

Metric internal thread of the prior art example (Refer to FIG. 4): 780 N/mm$^2$ Metric internal thread of the present invention (Refer to FIG. 1): 570 N/mm$^2$ Inverse buttress internal thread of the prior art example (Refer to FIG. 5): 592 N/mm$^2$ Inverse buttress internal thread of the present invention (Refer to FIG. 3): 490 N/mm$^2$ As apparent from the above, as to the metric internal thread, the stress value according to one example of the present invention is reduced by 27% than the prior art example. As to the inverse buttress internal thread, the stress value according to one example of the present invention is reduced by 17% than the prior art example. As a result, it is understood that, according to the present invention, the fracture strength of the internal thread is extremely improved in comparison with the prior art examples.

What is claimed is:

1. A screw comprising:
    a first member having a plurality of alternating first thread ridges and first thread grooves, a ridge width of the first thread ridges being larger than a groove width of the first thread grooves at a linear measurement diameter of the first member;
    wherein the linear measurement diameter is determined by calculating a linear pitch diameter of a hypothetical member having a plurality of hypothetical thread grooves and hypothetical thread ridges, with the hypothetical thread grooves being identical to the first thread grooves, and with the hypothetical thread ridges and the hypothetical thread grooves having identical, but opposite, profiles, and with the linear measurement diameter being identical to the linear pitch diameter of the hypothetical member.

2. The screw of claim 1, wherein:
    the ratio of the ridge width to the groove width at the measurement diameter is about 1.25:0.75.

3. The screw of claim 1, wherein:
    the screw is located within an accumulator.

4. The screw of claim 1, wherein:
    the first thread ridges are triangular.

5. The screw of claim 1, wherein:
    the first thread ridges comprise an inverse buttress.

6. A screw assembly comprising:
    a first screw having a plurality of alternating first thread ridges and first thread grooves, a ridge width of the first thread ridges being larger than a groove width of the first thread grooves at a linear measurement diameter of the first screw; and
    a second screw having a plurality of alternating second thread ridges and second thread grooves;

the first screw being engaged with the second screw by placing the first thread ridges of the first screw into the second thread grooves of the second screw and by placing the second thread ridges of the second screw into the first thread grooves of the first screw;

wherein the linear measurement diameter is determined by calculating a linear pitch diameter of a hypothetical member having a plurality of hypothetical thread grooves and hypothetical thread ridges, with the hypothetical thread grooves being identical to the first thread grooves, and with the hypothetical thread ridges and the hypothetical thread grooves having identical, but opposite, profiles, and with the linear measurement diameter being identical to the linear pitch diameter of the hypothetical member; and wherein the first screw is weaker than the second screw.

7. The screw assembly of claim 6, wherein:
the ratio of the ridge width to the groove width at the measurement diameter is about 1.25:0.75.

8. The screw assembly of claim 6, wherein:
the screw assembly is located within an accumulator.

9. The screw assembly of claim 6, wherein:
the first screw is internal of the second screw.

10. The screw assembly of claim 9, wherein:
the first thread ridges are triangular.

11. The screw assembly of claim 9, wherein:
the first thread ridges comprise an inverse buttress.

12. The screw assembly of claim 6, wherein:
the first thread ridges are triangular.

13. The screw assembly of claim 6, wherein:
the first thread ridges comprise an inverse buttress.

* * * * *